(12) United States Patent
Pan et al.

(10) Patent No.: US 12,491,958 B2
(45) Date of Patent: Dec. 9, 2025

(54) AUXILIARY ASSEMBLY FOR BICYCLE

(71) Applicant: C-TECH UNITED CORPORATION, New Taipei (TW)

(72) Inventors: Hsin-Dai Pan, New Taipei (TW); Chun-Hung Chou, New Taipei (TW); Chih-Kun Yang, New Taipei (TW)

(73) Assignee: C-TECH UNITED CORPORATION, New Taipei (TW)

( * ) Notice: Subject to any disclaimer, the term of this patent is extended or adjusted under 35 U.S.C. 154(b) by 371 days.

(21) Appl. No.: 18/457,354

(22) Filed: Aug. 29, 2023

(65) Prior Publication Data
US 2025/0074528 A1  Mar. 6, 2025

(51) Int. Cl.
| | |
|---|---|
| *B62J 43/13* | (2020.01) |
| *B60L 1/00* | (2006.01) |
| *B62J 43/28* | (2020.01) |
| *B62J 50/22* | (2020.01) |
| *B62M 6/90* | (2010.01) |

(52) U.S. Cl.
CPC .................. *B62J 43/13* (2020.02); *B60L 1/00* (2013.01); *B62M 6/90* (2013.01); *B62J 43/28* (2020.02); *B62J 50/22* (2020.02)

(58) Field of Classification Search
CPC . B62J 43/13; B62J 43/28; B62J 50/22; B62M 6/90
See application file for complete search history.

(56) References Cited

U.S. PATENT DOCUMENTS

| | | | | |
|---|---|---|---|---|
| 6,762,572 | B1 * | 7/2004 | Ishii | .......................... B60L 3/00 |
| | | | | 323/282 |
| 10,137,954 | B2 * | 11/2018 | Hendey | .................... B62M 6/90 |
| 10,930,903 | B2 * | 2/2021 | Mitsuyasu | ............... B62M 6/90 |
| 11,396,346 | B2 * | 7/2022 | De La Serna Gonzalez | ............... |
| | | | | B62J 11/19 |

(Continued)

FOREIGN PATENT DOCUMENTS

| | | |
|---|---|---|
| CN | 215298370 U | 12/2021 |
| CN | 115473252 A | 12/2022 |

(Continued)

*Primary Examiner* — Emma K Frick
(74) *Attorney, Agent, or Firm* — Li & Cai Intellectual Property Office (57) ABSTRACT

An auxiliary assembly includes an auxiliary device and a battery device. The auxiliary device includes a charging connector and a passive magnetic attraction component. The battery device includes a power supply connector, an active magnetic attraction component, and a management module. The charging connector is detachably mounted on a mounting rail of the power supply connector, so to move between a power supply position and a detachment position. When the charging connector is located at the power supply position, the passive magnetic attraction component can be magnetically attracted by the active magnetic attraction component. When the charging connector is located at the detachment position, the passive magnetic attraction component can be detached from the active magnetic attraction component. The management module controls the active magnetic attraction component to perform a magnetic action on the passive magnetic attraction component, so that the power supply connector charges the charging connector.

10 Claims, 6 Drawing Sheets

(56) References Cited

U.S. PATENT DOCUMENTS

| | | | | |
|---|---|---|---|---|
| 2013/0241174 A1* | 9/2013 | Meyer | .................... | B62K 25/30 |
| | | | | 280/281.1 |
| 2018/0017241 A1 | 1/2018 | Grider et al. | | |
| 2025/0074529 A1* | 3/2025 | Yang | ................... | H02J 7/00712 |
| 2025/0079590 A1* | 3/2025 | Yang | ................... | H01M 50/204 |

FOREIGN PATENT DOCUMENTS

| | | | | | |
|---|---|---|---|---|---|
| CN | 115649089 | A | | 1/2023 | |
| CN | 218343314 | U | | 1/2023 | |
| DE | 202022104485 | U1 | * | 8/2022 | ............. B62K 19/30 |
| JP | 201993908 | A | | 6/2019 | |
| WO | WO2021224647 | A2 | | 11/2021 | |

* cited by examiner

AUXILIARY ASSEMBLY FOR BICYCLE

FIELD OF THE DISCLOSURE

The present disclosure relates to an auxiliary assembly, and more particularly to an auxiliary assembly for a bicycle.

BACKGROUND OF THE DISCLOSURE

Various auxiliary devices for bicycles are currently available on the market, including devices such as electric gear shifting systems, automatic suspension adjustment devices, electric seat adjustment systems, and ABS brake control systems. Each of these auxiliary devices relies on electrical energy as its power source. However, when the power level of these auxiliary devices is low, users need to individually connect each device to a power source (e.g., utility power) for charging, causing inconvenience in their usage.

SUMMARY OF THE DISCLOSURE

In response to the above-referenced technical inadequacies, the present disclosure provides an auxiliary assembly for a bicycle.

In order to solve the above-mentioned problems, one of the technical aspects adopted by the present disclosure is to provide an auxiliary assembly for a bicycle. The auxiliary device is configured to be mounted on a bicycle. The auxiliary device includes a charging connector and a passive magnetic attraction component. The battery device is configured to be used to provide power for the bicycle to be driven. The battery device includes two battery packs, a power supply connector, an active magnetic attraction component, and a management module. The power supply connector is electrically coupled to the two battery packs. The power supply connector includes a mounting rail, and the charging connector of the auxiliary device is detachably mounted on the mounting rail, so that the charging connector is configured to move between a power supply position and a detachment position. The active magnetic attraction component is installed on the power supply connector. When the charging connector is located at the power supply position, the passive magnetic attraction component can be magnetically attracted by the active magnetic attraction component. When the charging connector is located at the detachment position, the passive magnetic attraction component can be detached from the active magnetic attraction component. The management module is electrically coupled to the active magnetic member and the power supply connector. The management module is configured to control the active magnetic attraction component to perform a magnetic action on the passive magnetic attraction component, so that the power supply connector is configured to charge the charging connector.

Therefore, in the auxiliary assembly provided by the present disclosure, by virtue of "the charging connector of the auxiliary device being detachably mounted on the mounting rail, so that the charging connector is configured to move between a power supply position and a detachment position," and "the management module being configured to control the active magnetic attraction component to perform a magnetic action on the passive magnetic attraction component, so that the power supply connector is configured to charge the charging connector," the auxiliary assembly for the bicycle can conveniently charge the auxiliary device through the magnetic attraction relationship between the active magnetic attraction component and passive magnetic attraction component.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 1:
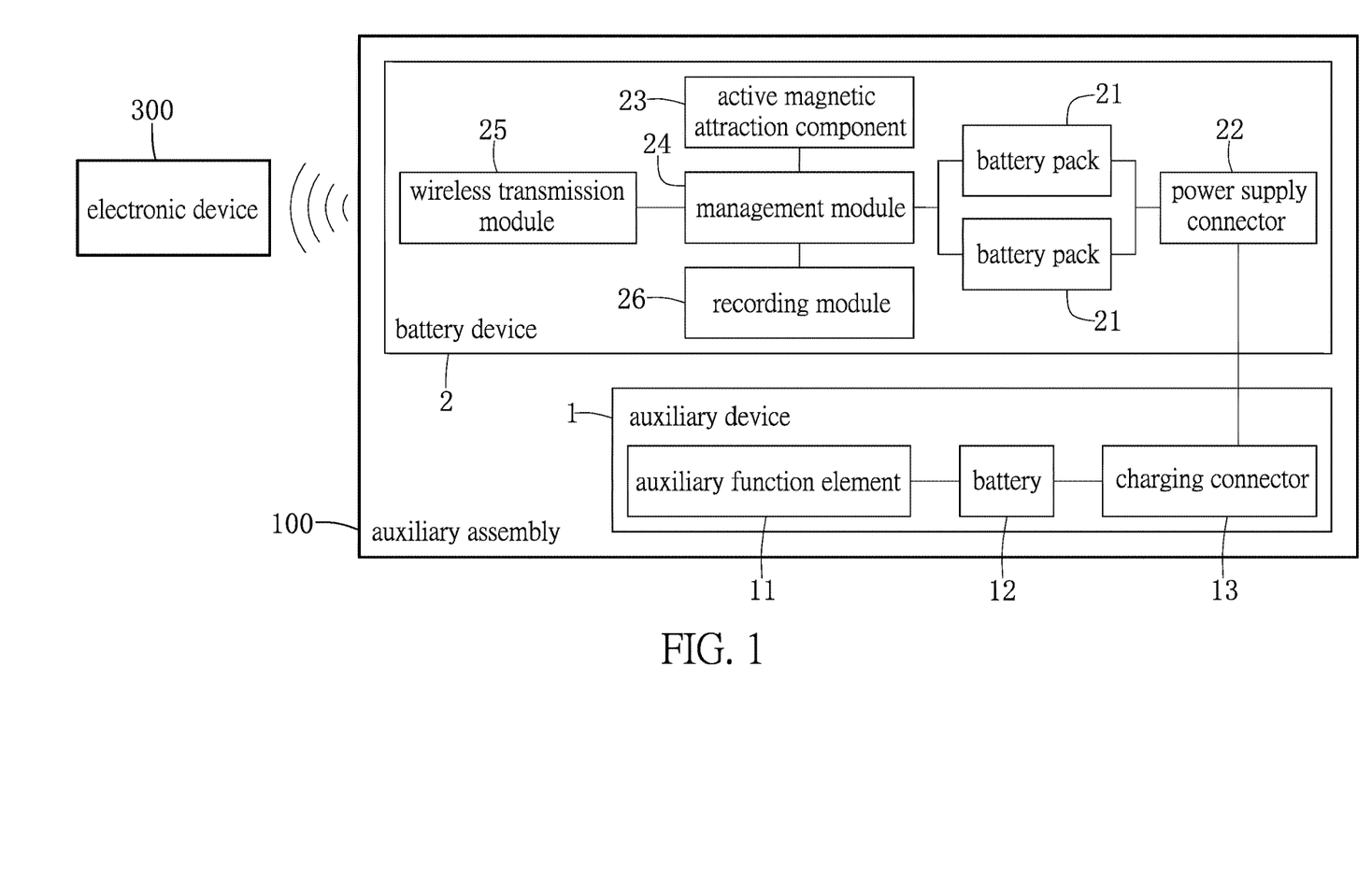
FIG. 1 is a circuit block diagram of an auxiliary assembly according to the present disclosure.
Figure 2:
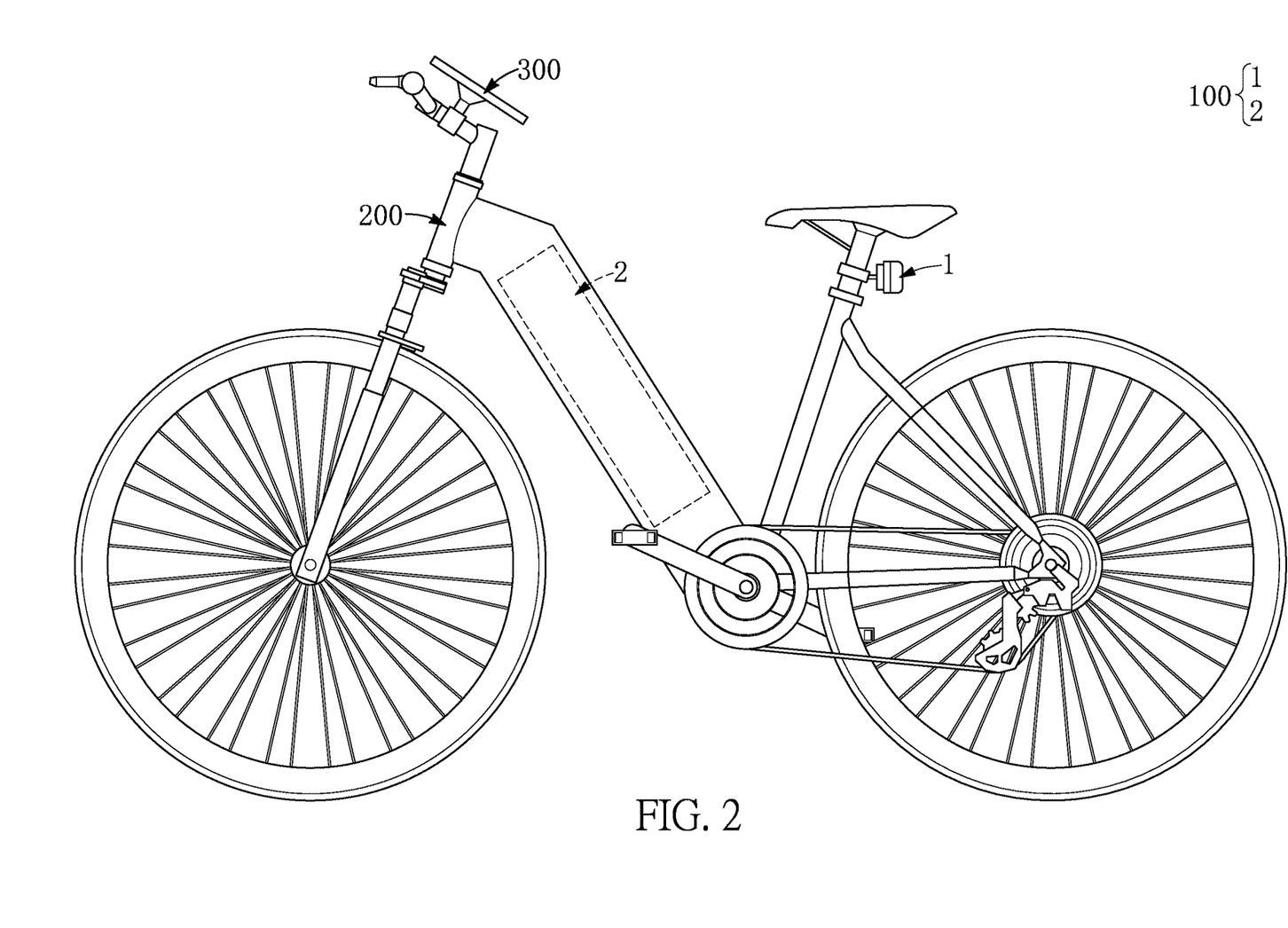
FIG. 2 is a schematic view showing the auxiliary assembly being installed on a bicycle according to the present disclosure.

Referring to FIG. 1 to FIG. 6, the present disclosure provides an auxiliary assembly 100 for a bicycle. As shown in FIG. 1 and FIG. 2, the auxiliary assembly 100 includes an auxiliary device 1 and a battery device 2. The following description describes the structure and connection relation of each component of the auxiliary assembly 100.

Figure 3:
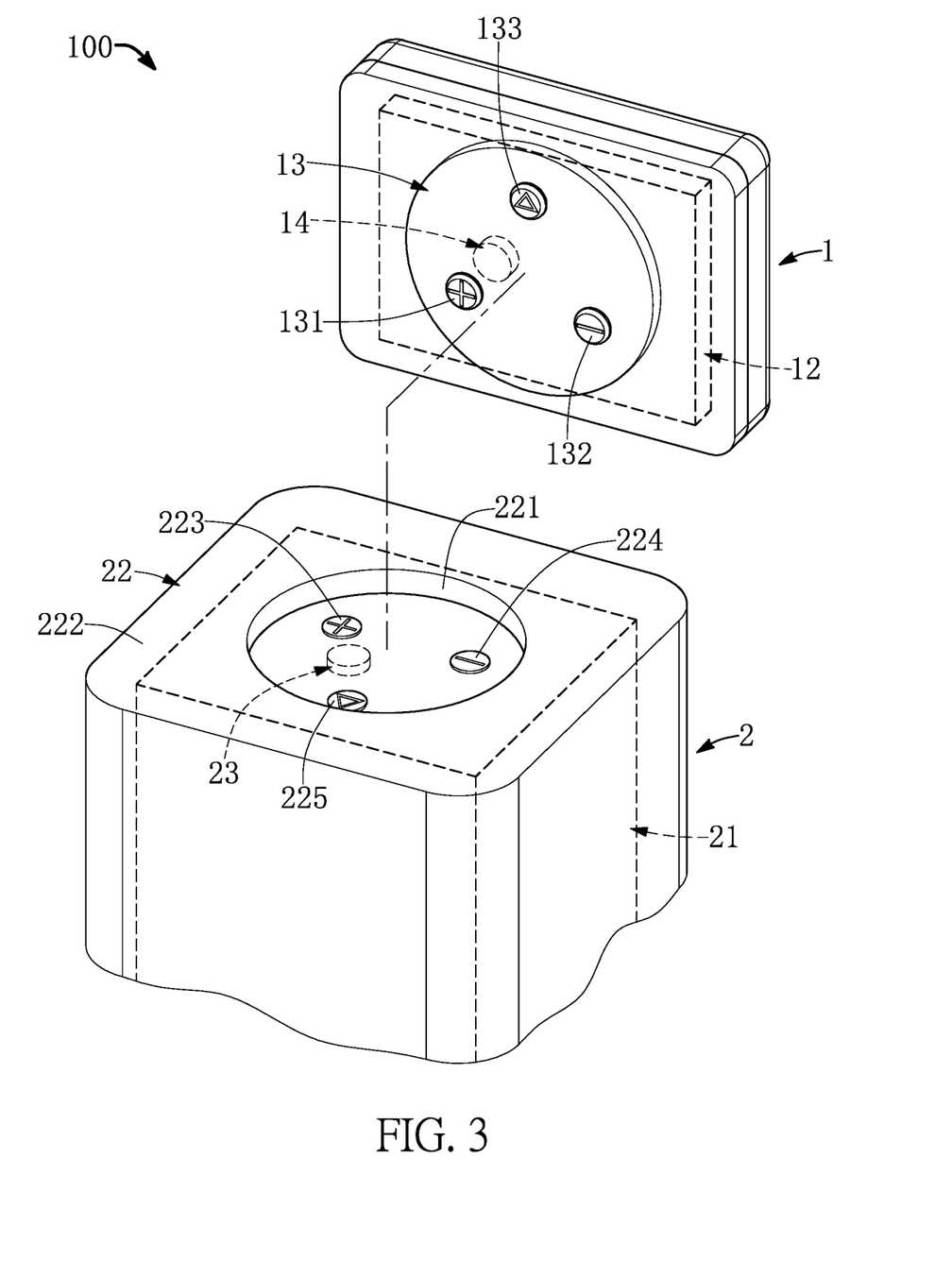
FIG. 3 is a schematic partial perspective view of the auxiliary assembly according to the present disclosure.

Referring to FIG. 1 and FIG. 3, the auxiliary device 1 is used to be installed on a bicycle 200, and the auxiliary device 1 includes an auxiliary function element 11, a battery 12 electrically coupled to the auxiliary function element 11, a charging connector 13 electrically coupled to the battery 12, and a passive magnetic attraction component 14 that is disposed on the charging connector 13.

In practice, the auxiliary function element 11 is powered by the battery 12 as an energy source, and the auxiliary function element 11 can include a flashing warning light, a seat height adjuster for the bicycle 200, a gear shifter, and/or an adjuster for the suspension system intensity. Alternatively, the auxiliary function element 11 can be a recorder for recording the driving information (e.g., speed and route) of the bicycle 200. The charging connector 13 can be fixed on the battery device 2 through the passive magnetic attraction component 14, so as to charge the battery 12.

The charging connector 13 includes a second positive contact point 131, a second negative contact point 132, and a second alignment contact point 133. The second positive contact point 131 and the second negative contact point 132 can be electrically coupled to a positive pole and a negative pole of the battery 12. The second alignment contact point 133 is a matching structure, and the matching structure can be, for example, a groove or a protrusion.

Referring to FIG. 1 and FIG. 3, the battery device 2 is used to provide the power to drive the bicycle 200, and the battery device 2 includes two battery packs 21, a power supply connector 22, an active magnetic attraction component 23, and a management module 24. The two battery packs 21 can supply power to the bicycle 200 and the auxiliary device 1. Preferably, the two battery packs 21 can supply power in turns.

Specifically, the management module 24 in the present embodiment is a battery management system and has both computational and storage capabilities. The management module 24 can obtain information of each of the two battery packs 21, so as to control one of the two battery packs 21 to supply power to the bicycle 200 and to control another one of the two battery packs 21 to suspend operation. Accordingly, one of the two battery packs that is suspended from operation can perform a cooling action, and then be used to replace another one of the two battery packs 21 that supplies power.

In detail, the management module 24 can obtain a battery health data for each of the two battery packs 21. When the management module 24 detects that a first variation between two battery health data is greater than 2%, the management module 24 selects one of the two battery packs 21 in which the battery health data is high to supply power to the bicycle 200, and another one of the two battery packs 21 in which the battery health data is low is controlled to suspend operation. Conversely, when the management module 24 detects that the first variation between the two battery health data is less than 2%, the management module selects one of the two battery packs 21 to supply power to the bicycle according to a first rule (which will be described later).

It should be noted that each of the two battery health data in the present embodiment is represented by a relationship of $G \times \Delta v / \Delta i$, $\Delta v$ represents a sampled voltage variation of each of the two battery packs 21 within a unit of time, $\Delta i$ represents a sampled current variation of each of the two battery packs 21 within a unit of time, and G represents an ideal weighted value obtained through Taguchi methods.

In practical applications, personnel first select five experiment subjects with the same specifications and design a target parameter (i.e., a battery health factor and its level) to choose an appropriate orthogonal table. Furthermore, the personnel use a signal/noise ratio (S/N) analysis and an analysis of variance to test an influence degree of the target parameter on each of the experiment subjects, so as to obtain the ideal weighted value that allows the relationship of $\Delta v / \Delta i$ to approach an actual battery degradation. Since using the Taguchi methods to obtain the ideal weighted value is well known to those skilled in the art, details thereof will not be specially described herein.

Then, the personnel can write the ideal weighted value into the management module 24, and the management module 24 can perform weighted calculation after obtaining the sampled voltage variation of each of the two battery packs 21 within the unit of time and the sampled current variation of each of two battery packs 1 within the unit of time, so as to obtain each of the two pieces of the battery health data. Accordingly, the management module 24 can obtain the battery health data of each of the two battery packs 21 at different time points, and compare the battery health data of the two battery packs 21.

Preferably, the management module 24 can also obtain a battery capacity data for each of the two battery packs 21, so as to determine the first rule. Specifically, in the first rule, when the management module 24 detects that a second variation between the two battery capacity data is greater than 50%, the management module 24 selects one of the two battery packs 21 in which the battery capacity data is high to supply power to the bicycle 200, and another one of the two battery packs 21 in which the battery health data is low is controlled to suspend operation. When the management module 24 detects that the second variation between the two battery capacity data is less than 50%, the management module 24 selects one of the two battery packs 21 to supply power to the bicycle 200 according to a second rule (which will be described later).

It should be noted that each of the two battery capacity data is represented by a relationship of $\Sigma_{t=0}^{t=K} i_c \times t$, $i_c$ represents a current value of each of the two battery packs 21, and K represents a predetermined time programmed for each of the two battery packs 21, but the present disclosure is not limited thereto.

In a practical application, the management module 24 can also obtain the sampled voltage variation within the unit of time from each of the two battery packs 21, so as to determine the second rule. In the second rule, the management module 24 selects one of the two battery packs 21 in which the sampled voltage variation is high to supply power to the bicycle 200, and another one of the two battery packs 21 in which the sampled voltage variation is low to suspend operation.

The sampled voltage variation is represented by a relationship of $V_{C1} - V_{C2}$, $V_{C1}$ represents a current voltage value obtained as a steady-state average of the current using Ohm impedance as a reference value, and $V_{C2}$ represents a current voltage value obtained using a current threshold value that exceeds a polarization impedance as a reference value.

Figure 6:
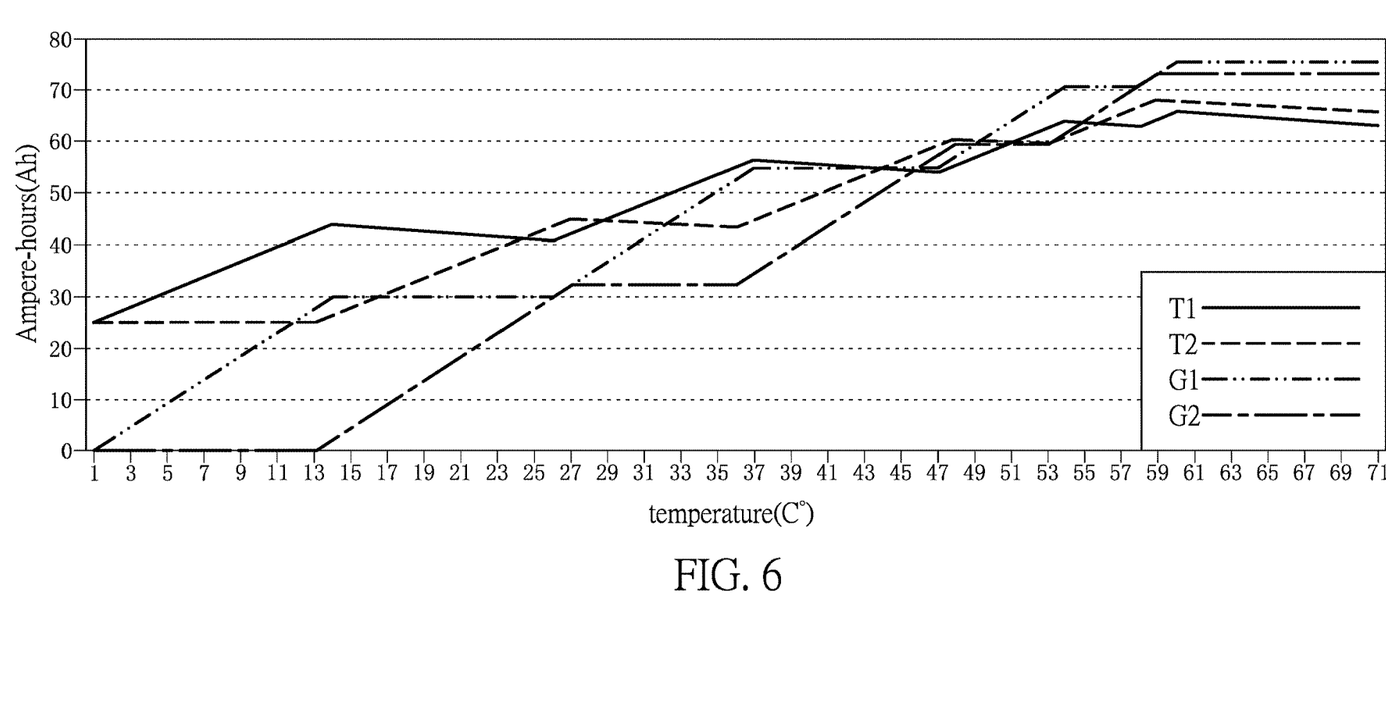
FIG. 6 is a graph illustrating a relationship between an ampere-hour and a temperature of a battery device according to the present disclosure.

It should be noted that FIG. 6 is a graph of the battery device 2 during actual operation of the present disclosure. The horizontal axis represents Ampere-hours, and the vertical axis represents temperature. The graph includes two temperature data lines T1, T2 and two capacitance data lines G1, G2 of the two battery packs 21. It can be seen from FIG. 6 that, when the capacitance of each of the two battery packs 21 is between 60 ampere hours and 85 ampere hours, the temperature of each of the two battery packs 21 is less than 68° C. In other words, the two battery packs 21 do not reach a peak temperature after being almost fully discharged. In addition, in the present embodiment, the battery device 2 includes the two battery packs 21. However, in certain embodiments of the present disclosure (not shown), the battery device 2 may include multiple ones of the battery pack 21.

Referring to FIG. 1 and FIG. 3, the power supply connector 22 is electrically coupled to the two battery packs 21, and the power supply connector 22 includes a mounting rail 221. The charging connector 13 of the auxiliary device 1 can be detachably mounted on the mounting rail 221, so that the charging connector 13 is configured to move between a power supply position P1 (as shown in FIG. 4) and a detachment position P2 (as shown in FIG. 5).

In the present embodiment, the power supply connector 22 includes a casing 222, one side of the casing 222 has a mounting hole (not labeled in the figures), and an inner edge of the mounting hole is the mounting rail 221, so that the charging connector 13 can rotate between the power supply position P1 and the detachment position P2, but the present disclosure is not limited thereto. For example, in certain embodiments of the present disclosure (not shown), the mounting rail 221 can be spiral.

It should be noted that the power supply connector 22 also includes a first positive contact point 223, a first negative contact point 224, and a first alignment contact point 225 that are located in the mounting hole. The first positive contact point 223 and the first negative contact point 224 can provide a positive pole and a negative pole through the two battery packs. The first alignment contact point 225 is a matching structure geometrically matched with the second alignment contact point 133, and the matching structure can be, for example, a groove or a protrusion.

Figure 4:
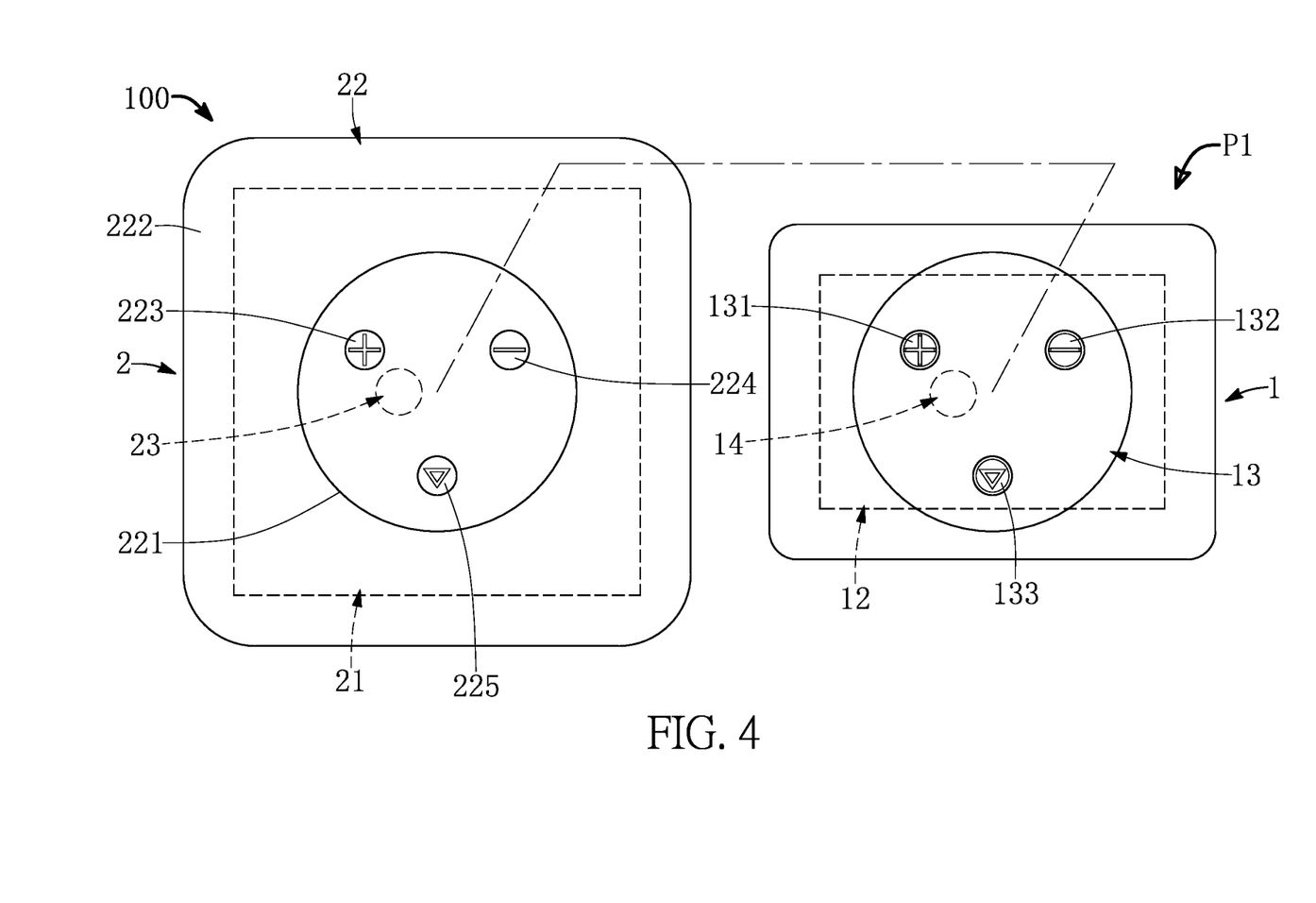
FIG. 4 is a schematic view showing a charging connector located at a power supply position according to the present disclosure.
Figure 5:
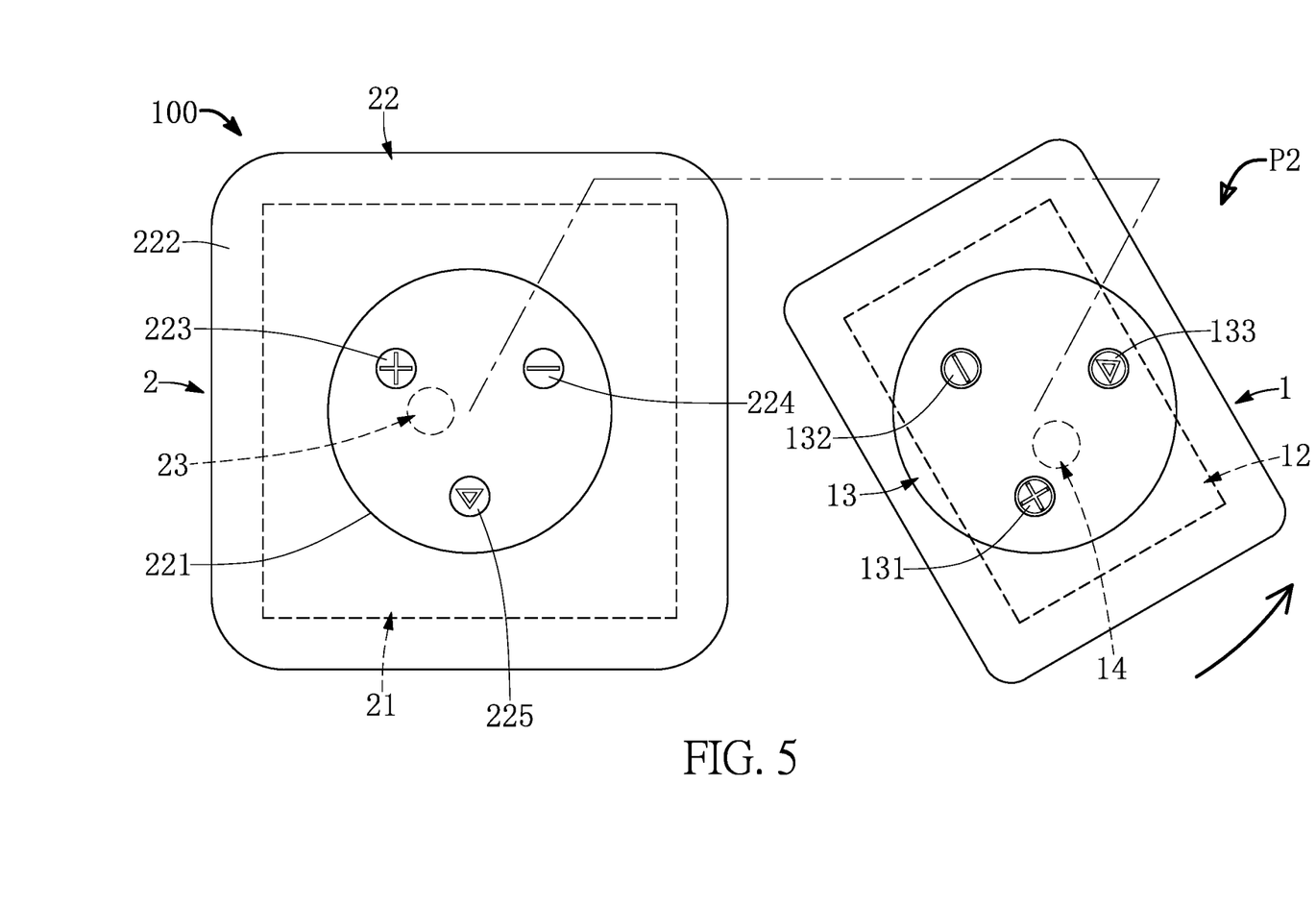
FIG. 5 is a schematic view showing the charging connector located at a detachment position according to the present disclosure.

Referring to FIG. 4, when the power supply connector 22 is in the power supply position P1, the first positive contact point 223 corresponds in position to the second positive contact point 131, and the first negative contact point 224 corresponds in position to the second negative contact point 132. Referring to FIG. 5, when the power supply connector 22 is in the detachment position P2, the first alignment contact point 225 corresponds in position to the second positive contact point 131 or the second negative contact point 132.

Preferably, the first positive contact point 223, the first negative contact point 224, and the first alignment contact point 225 are arranged in an equilateral triangle. The second positive contact point 131, the second negative contact point 132, and the second alignment contact point 133 are arranged in an equilateral triangle.

Referring to FIG. 3 to FIG. 5, the active magnetic attraction component 23 in the present embodiment can be an electromagnet, and installed on the power supply connector 22 to complement the passive magnetic attraction component 14 as a means of securing the auxiliary device 1. Specifically, when the charging connector 13 is located at the power supply position P1, the passive magnetic attraction component 14 can be magnetically attracted by the active magnetic attraction component 23. When the charging connector 13 is located at the detachment position P2, the passive magnetic attraction component 14 can be detached from the active magnetic attraction component 23.

Preferably, the active magnetic attraction component 23 is located at an eccentric position in the mounting hole, and the passive magnetic attraction component 14 is also located at an eccentric position of a butt cylinder of the charging connector 13. Accordingly, when the active magnetic attraction component 23 magnetically attracts the passive magnetic attraction component 14, the active magnetic attraction component 23 cooperates with the mounting hole and the docking cylinder to limit rotation.

In practice, the active magnetic attraction component 23 can be controlled by the management module 24, so that the management module 24 can control the charging connector 13 to be fixed and accurately charge the charging connector 13 located in the power supply position P1.

Specifically, the management module 24 is electrically coupled to the active magnetic attraction component 23 and the power supply connector 22. The management module 24 can control the active magnetic attraction component 23 to perform a magnetic action on the passive magnetic attraction component, so that the power supply connector 22 can charge the charging connector 13. In other words, when the management module 24 detects that the charging connector 13 is in the power supply position P1, the management module 24 can control the active magnetic attraction component 23 to perform a magnetic action, and at the same time allow the power supply connector 22 to supply power to the charging connector 13. Conversely, when the management module 24 detects that the charging connector 13 is in the detachment position P2, the management module 24 can control the active magnetic attraction component 23 to not perform a magnetic action, and at the same time not allow the power supply connector 22 to supply power to the charging connector 13.

Accordingly, in the auxiliary assembly 100 provided by the present disclosure, by virtue of "a position change between the first contact point 225 and the second contact point 133," and "the management module 24 controlling the active magnetic attraction component 23 and the power supply connector 22," the auxiliary assembly 100 has two fool-proof effects.

Preferably, the battery device 2 also includes a wireless transmission module 25 and a recording module 26. The wireless transmission module 25 and the recording module 26 are electrically coupled to the management module 24, so as to be used to control, record, and display an electronic device 300 (e.g., a mobile phone) of the user. Specifically, the wireless transmission module 25 can be used to receive a wireless control signal from the electronic device 300, so that the management module 24 can control the active magnetic attraction component 23 to remove the adsorption action of the passive magnetic attraction component 14. In addition, the recording module 26 can detect a period of time when the power supply connector 22 is detached from the charging connector 13, and the management module 24 can read a specification data of the auxiliary device 1, so as to cooperate with the time period information to calculate a current power of the auxiliary device 1. The management module 24 can use the wireless transmission module 25 to transmit the current power to a display interface (of the electronic device).

Beneficial Effects of the Embodiment

In conclusion, in the auxiliary assembly provided by the present disclosure, by virtue of "the charging connector of the auxiliary device being detachably mounted on the mounting rail, so that the charging connector is configured to move between a power supply position and a detachment position," and "the management module being configured to control the active magnetic attraction component to perform a magnetic action on the passive magnetic attraction component, so that the power supply connector is configured to charge the charging connector," the auxiliary assembly for the bicycle can conveniently charge the auxiliary device through the magnetic attraction relationship between the active magnetic attraction component and passive magnetic attraction component.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An auxiliary assembly for a bicycle, comprising:
   an auxiliary device configured to be mounted on the bicycle, wherein the auxiliary device includes a charging connector and a passive magnetic attraction component;
   a battery device configured to be used to provide power for the bicycle to be driven, wherein the battery device includes:
      two battery packs;
      a power supply connector electrically coupled to the two battery packs, wherein the power supply connector includes a mounting rail, and the charging connector of the auxiliary device is detachably mounted on the mounting rail, so that the charging connector is configured to move between a power supply position and a detachment position;
      an active magnetic attraction component installed on the power supply connector, wherein, when the charging connector is located at the power supply position, the passive magnetic attraction component is configured to be magnetically attracted by the active magnetic attraction component, and wherein, when the charging connector is located at the detachment position, the passive magnetic attraction component is configured to be detached from the active magnetic attraction component; and
      a management module electrically coupled to the active magnetic member and the power supply connector, wherein the management module is configured to control the active magnetic attraction component to perform a magnetic action on the passive magnetic attraction component, so that the power supply connector is configured to charge the charging connector.

2. The auxiliary assembly according to claim 1, wherein the battery device includes a wireless transmission module electrically coupled to the management module, the wireless transmission module is configured to be used to receive a wireless control signal, so that the management module controls the active magnetic attraction component to release the passive magnetic attraction component from magnetic attachment.

3. The auxiliary assembly according to claim 2, wherein the battery device includes a recording module electrically coupled to the management module, and the recording module is configured to detect a period of time when the power supply connector is detached from the charging connector; wherein the management module is configured to read specification data of the auxiliary device, so as to cooperate with the time period information to calculate a current power of the auxiliary device; and wherein the management module is configured to use the wireless transmission module to transmit the current power to a display interface.

4. The auxiliary assembly according to claim 1, wherein the power supply connector includes a first positive contact point, a first negative contact point and a first alignment contact point, and the charging connector includes a second positive contact point, a second negative contact point and a second alignment contact point; wherein, when the power supply connector is in the power supply position, the first positive contact point corresponds in position to the second positive contact point, and the first negative contact point corresponds in position to the second negative contact point; and wherein, when the power supply connector is in the detachment position, the first alignment contact point corresponds in position to the second positive contact point or the second negative contact point.

5. The auxiliary assembly according to claim 4, wherein the first positive contact point, the first negative contact point, and the first alignment contact point are arranged in an equilateral triangle; and wherein the second positive contact point, the second negative contact point, and the second alignment contact point are arranged in an equilateral triangle.

6. The auxiliary assembly according to claim 5, wherein the mounting rail is in a spiral shape, so that the charging connector of the auxiliary device is configured to be mounted on the mounting rail by rotating.

7. The auxiliary assembly according to claim 1, the management module is configured to obtain a piece of battery health data for each of the two battery packs; wherein, when the management module detects that a first variation between the two pieces of the battery health data is greater than 2%, the management module selects one of the two battery packs in which the battery health data is high to supply power to the bicycle, and another one of the two battery packs in which the battery health data is low is controlled to suspend operation; wherein, when the management module detects that the first variation between the two pieces of the battery health data is less than 2%, the management module selects one of the two battery packs to supply the power to the bicycle according to a first rule.

8. The auxiliary assembly according to claim 7, wherein the management module is configured to obtain a piece of battery capacity data for each of the two battery packs; wherein, in the first rule, when the management module detects that a second variation between the two pieces of the battery capacity data is greater than 50%, the management module selects one of the two battery packs in which the battery capacity data is high to supply the power to the bicycle, and another one of the two battery packs in which the battery health data is low is controlled to suspend operation; wherein, in the first rule, when the management module detects that the second variation between the two pieces of the battery capacity data is less than 50%, the management module selects one of the two battery packs to supply the power to the bicycle according to a second rule.

9. The auxiliary assembly according to claim 8, wherein each of the two pieces of the battery health data is represented by a relationship of $G \times \Delta v / \Delta i$, $\Delta v$ represents a sampled voltage variation of each of the two battery packs within a unit of time, $\Delta i$ represents a sampled current variation of each of the two battery packs within the unit of time, and G represents an ideal weighted value obtained through Taguchi methods; and wherein each of the two pieces of the battery capacity data is represented by a relationship of $\sum_{t=0}^{t=K} i_c \times t$, $i_c$ represents a current value of each of the two battery packs, and K represents a predetermined time that is programmed for each of the two battery packs.

10. The auxiliary assembly according to claim 8, wherein the management module is configured to obtain a sampled voltage variation from each of the two battery packs within a unit of time; wherein, in the second rule, the management module selects one of the two battery packs in which the sampled voltage variation is high to supply the power to the bicycle, and another one of the two battery packs in which the sampled voltage variation is low is controlled to suspend operation; and wherein the sampled voltage variation is represented by a relationship of $V_{C1}-V_{C2}$, $V_{C1}$ represents a current voltage value obtained by using an ohm impedance that is a steady-state current average as a reference value, and $V_{C2}$ represents a current voltage value obtained by using a current threshold value that exceeds a polarization impedance as the reference value.

* * * * *